(12) United States Patent
Sundström (10) Patent No.: US 8,477,773 B2
(45) Date of Patent: Jul. 2, 2013

(54) METHOD, DEVICE AND SYSTEM FOR MULTI FIELD CLASSIFICATION IN A DATA COMMUNICATIONS NETWORK

(75) Inventor: Mikael Sundström, Luleå (SE)

(73) Assignee: Oricane AB, Lulea (SE)

( * ) Notice: Subject to any disclaimer, the term of this patent is extended or adjusted under 35 U.S.C. 154(b) by 828 days.

(21) Appl. No.: 12/446,595

(22) PCT Filed: Nov. 2, 2007

(86) PCT No.: PCT/SE2007/050816
§ 371 (c)(1),
(2), (4) Date: Aug. 25, 2009

(87) PCT Pub. No.: WO2008/054323
PCT Pub. Date: May 8, 2008

(65) Prior Publication Data
US 2010/0238922 A1    Sep. 23, 2010

(30) Foreign Application Priority Data

Nov. 3, 2006 (SE) ..................................... 0602336
Feb. 15, 2007 (SE) ..................................... 0700378
Mar. 19, 2007 (SE) ..................................... 0700691

(51) Int. Cl.
*H04L 12/28* (2006.01)

(52) U.S. Cl.
USPC ............................. 370/389; 370/392; 341/51

(58) Field of Classification Search
USPC ..................... 370/389, 392; 341/51
See application file for complete search history.

(56) References Cited

U.S. PATENT DOCUMENTS

| 6,289,013 | B1 | 9/2001 | Lakshman et al. |
| 6,970,462 | B1 | 11/2005 | McRae |
| 2002/0191605 | A1* | 12/2002 | Lunteren et al. ............... 370/389 |
| 2003/0030575 | A1* | 2/2003 | Frachtenberg et al. ......... 341/51 |
| 2005/0018615 | A1 | 1/2005 | Itoh et al. |
| 2006/0104286 | A1* | 5/2006 | Cheriton ................... 370/395.32 |
| 2006/0221954 | A1 | 10/2006 | Narayan et al. |
| 2007/0008962 | A1* | 1/2007 | Basu et al. ..................... 370/389 |
| 2007/0195777 | A1* | 8/2007 | Tatar et al. .................... 370/392 |

FOREIGN PATENT DOCUMENTS

| WO | 01/59702 | 8/2001 |
| WO | 0159702 | 8/2001 |

OTHER PUBLICATIONS

Extended European Search Report for Application No. 07835400.8 dated Oct. 2, 2012.

* cited by examiner

*Primary Examiner* — Wei Zhao
(74) *Attorney, Agent, or Firm* — Renner, Otto, Boisselle & Sklar, LLP (57) ABSTRACT

The present invention pertains to a method for performing specific data forwarding actions depending on the nature of data traffic comprising data packets, which method comprises the steps of: —receiving incoming data traffic of a specific nature, belonging to at least a specific class among a number of pre-defined classes, step 101—classifying the data traffic by determining the nature of the data traffic, step 102, provided by a process of inspecting values of one or more selected header field(s) of an address space of a data packet and selecting a first matching class from an ordered list of classes providing multi-dimensional classification, step 103.

34 Claims, 8 Drawing Sheets

METHOD, DEVICE AND SYSTEM FOR MULTI FIELD CLASSIFICATION IN A DATA COMMUNICATIONS NETWORK

This application is a national phase of International Application No. PCT/SE2007/050816 filed Nov. 2, 2007 and published in the English language.

TECHNICAL FIELD

The present invention relates to a method, device and system for multi field classification in a data communications network.

BACKGROUND

Internet is formed of a plurality of networks connected to each other, wherein each of the constituent networks maintains its identity. Each network supports communication among devices connected to the networks, and the networks in their turn are connected by routers. Thus, Internet can be considered to comprise a mass of routers interconnected by links. Communication among nodes (routers) on Internet takes place using an Internet protocol, commonly known as IP. IP datagrams (packets) are transmitted over links from one router to the next one on their ways towards the final destinations. In each router a forwarding decision is performed on incoming datagrams to determine the datagrams next-hop router.

Sometimes it is also desirable to block traffic or perform other specific actions depending on the nature of the traffic. This usually depends on which class the traffic belongs to among a number of pre-defined classes or policies. Each class is defined by a set of properties of the set of header fields of the packets. Typically, each header field in each class is defined by an interval, which can also be a single value, and the classes, or rules, are organized as a linear list of rules.

SUMMARY OF THE INVENTION

According to a principal aspect of the present invention, specific data forwarding and/or processing actions depending on the nature of the data traffic, such as blocking data traffic, is provided by classification of incoming data, such as packet classification or multi-field classification. This is provided by a process of inspecting values of selected header fields of a data packet and selecting a first matching rule. The selection is provided by selecting (or finding) from a list of rules or classes the first rule that matches a packet. In principle, each rule consist of D intervals where D is the number of header fields in the packet (or the potential number of header fields of interest). A packet is said to match a rule when the value of each header field of the packet lies within the corresponding interval in the rule. That is, the values contained in all header fields of the packet must match their corresponding interval in the rule.

According to a first embodiment of the present invention, this is provided by a method for performing specific data forwarding actions depending on the nature of data traffic comprising data packets. The method comprises the steps of:
receiving incoming data traffic of a specific nature, belonging to at least a specific class among a number of pre-defined classes,
classifying the data traffic by determining the nature of the data traffic, provided by a process of inspecting values of one or more selected header field(s) of an address space of a data packet and selecting a first matching class from an ordered list of classes. The classification is multi-dimensional.

According to a second embodiment of the present invention, the multidimensional classification is provided by means of a technique for crunching or compression of the address space upon which a classifier operates, by analyzing the list of rules and preparing a single field classifier per dimension (header field), to reduce the size of the universe in each dimension to 2n+1, where n is the number of rules, thus reducing the complexity of the multi-dimensional classification to at most ceil(lg(2n+1)) bits, where lg is the logarithm with base 2, in each dimension.

According to another aspect of the present invention, this is provided by a device of the kind defined in the introductory portion of the description and having the characterizing features of claim 8.

According to another aspect of the present invention, this is provided by a classifier device for performing specific data forwarding actions depending on the nature of data traffic comprising data packets comprises:
a storage for storing a datagram forwarding data structure provided for indicating where to forward a datagram in a network, which data structure is in the form of a tree comprising at least one leaf and possibly a number of nodes including partial nodes, said data structure having a height, corresponding to a number of memory accesses required for looking up a largest stored non-negative integer smaller than or equal to a query key, means arranged to
receive incoming data traffic of a specific nature, belonging to at least a specific class among a number of pre-defined classes, and
means arranged to classify the data traffic by determining the nature of the data traffic, provided by a process of inspecting values of one or more selected header field(s) of an address space of a data packet, and selecting a first matching class from an ordered list of classes providing multi-dimensional classification by means of crunching or compression.

According to yet another aspect of the present invention, this is provided by a system.

According to a fourth aspect of the present invention a computer program product is provided, having computer program code means to make a computer execute the above method when the program is run on a computer.

It is appreciated that the computer program product is adapted to perform embodiments relating to the above described method, as is apparent from the attached set of dependent system claims.

Additional features and advantages of the present invention are disclosed by the appended dependent claims.

BRIEF DESCRIPTION OF THE DRAWINGS

To further explain the invention embodiments chosen as examples will now be described in greater details with reference to the drawings of which.

DESCRIPTION OF EMBODIMENTS OF THE INVENTION

Before a detailed discussion of embodiments of the invention is given, the general background of the present invention related to a first part of the present invention, shall be discussed in more detail to ease the understanding of the principles of the invention, followed by a detailed description of a first part of an embodiment of the present invention. Thereafter, a second part shall be discussed in more detail, followed by a detailed description of a second part of the same embodiment as discussed before.

D-dimensional packet classification, or simply packet classification, means to select from a list of rules or classes the first rule that matches a packet. Each rule consists of D intervals corresponding to D header fields in the packet. Let Ri be the ith rule and [xij, yij] the jth interval of rule Ri. Note that, for addresses, intervals are sometimes represented by prefixes and for protocols by single points.

A packet with header fields h1, h2, . . . , hD matches rule Ri if and only if $xij \leq hj \leq yij$ for all $j=1, 2, \ldots, D$.

Typically, there are two dominating approaches to packet classification: Ternary CAMs which is a brute force hardware solution and algorithmic solutions using heuristics to exploit the structure of real life rule lists.

Most existing schemes will be affected in one way or other by replacing 32-bit IPv4 intervals with 128-bit IPv6 intervals in all rules. When this is applied to 128-bit IPv6 addresses, the actual classification can be done by legacy IPv4 classifiers.

Rules consisting of two addresses and two ports will roughly grow from 2·32+2·16=96 bits to 2·128+2·16=288 bits if the intervals are represented by prefixes or from 4·32+4·16=192 to 4·128+4≠16=576 bits if the intervals are represented as arbitrary ranges. For a hardware solution this translates directly into increased board space and power consumption for a fixed number of rules.

To our best knowledge, we are not aware of any benchmarks for algorithmic solutions and IPv6 based rules and it is therefore hard to make an accurate statement about the penalties caused by an IPv6 transition. For a comparison based packet classifier nodes will contain 128 bits values instead of 32 bits values and this will clearly increase the size of the nodes. It will also have considerable effect on the lookup speed if the nodes are carefully sized and aligned to exploit the memory block size b as we do with block trees. For trie based classifiers, the number of levels will most likely increase, resulting in reduced lookup performance, or grow considerably in size.

Clearly, it would be desirable if we could reduce the impact from larger addresses on the D-dimensional classifier. This is provided by means of the present invention, of which an embodiment will now be described. However, the invention is not limited to compression of IPv6 addresses but can also be used to compress IPv4 addresses to reduce the complexity of the classification and increase the performance.

Figure 1:
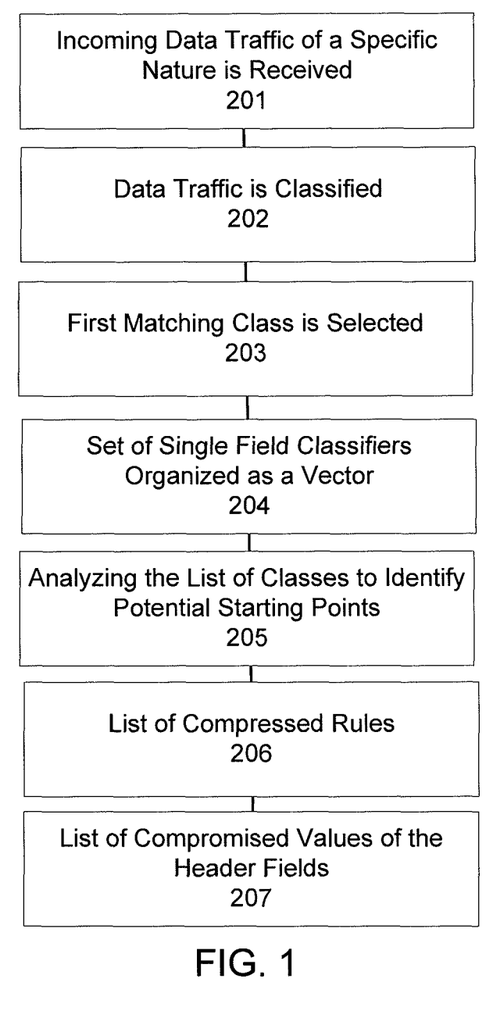
FIG. 1 is a flow-chart showing the method according to an embodiment of the present invention.
Figure 2:
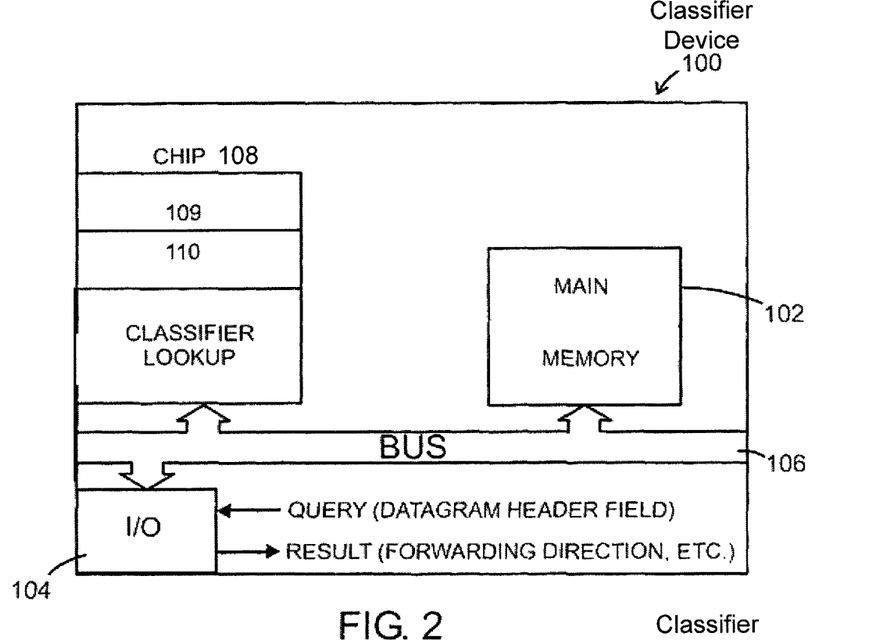
FIG. 2 illustrates a schematic block diagram of a (hardware) device according to an embodiment of the present invention.

Embodiments of the present invention will now be described with reference to FIGS. 1, and 2 (and FIG. 3), of which FIG. 2 illustrates the method steps and FIG. 1 illustrates a device according to an embodiment of the invention configured in hardware.

FIG. 1 illustrates a method for performing specific data forwarding actions depending on the nature of data traffic comprising data packets. In a first step, step 201, incoming data traffic of a specific nature is received. The data traffic belongs to at least a specific class among a number of pre-defined classes. In a second step, step 202, the data traffic is classified by determining the nature of the data traffic, provided by a process of inspecting values of one or more selected header field(s) of an address space of a data packet and a first matching class is selected from an ordered list of classes providing multi-dimensional classification in a third step, step 203.

All these method steps related to different embodiments of the present invention will be still further described below, but first is referred to FIG. 1, which is an illustration of a block schematic of a classifier device 100 for performing the method, according to an embodiment of the present invention. The classifier device 100 is implemented in hard-ware and could be referred to as a multi-dimensional classifier.

The hard-ware implemented classifier device 100 comprises an input/output unit 104 for transmission of data signals comprising data grams to or from a source or destination such as a router or the like (not shown). This input/output unit 104 could be of any conventional type including a cordless gate way/switch having input/output elements for receiving and transmitting video, audio and data signals. Data input is schematically illustrated as "query" of one or more data header field(s), and data output as a result such as forwarding direction, policy to apply or the like. Arranged to communicate with this input/output unit 104 there is provided a system bus 106 connected to a control system 108 for instance including a custom classification accelerator chip arranged to process the data signals.

The device 100 comprises means 109 for receiving incoming data traffic of a specific nature, belonging to at least a specific class among a number of pre-defined classes, and means 110 for classifying the data traffic by determining the nature of the data traffic, provided by a process of inspecting values of one or more selected header field(s) of an address space of a data packet, and selecting a first matching class from an ordered list of classes providing multi-dimensional classification.

The multidimensional classification is provided by means of a technique for compression of the address space upon which a classifier operates providing multi-dimensional classification.

Typically, the chip 108 provides, or includes, means 109, 110 for analyzing a rule set to prepare an array of single field classifiers, consisting of up to one single field classifier for each dimension, converting the original rule set to a corresponding list of compressed rules by using the array of single field classifiers, loading the array of single field classifier representations into a corresponding array of single field classifiers implemented in custom hardware on a chip to accelerate throughput, loading the list of compressed rules into a special kind of TCAM-like memory where each cell corresponds to one rule and each cell stores the boundaries (minimum and maximum) of one interval in each dimension wherein the actual classification of a list of header fields is achieved by first compressing the value of each header field in parallel using the array of single field classifiers to produce a compressed list of header fields which is then classified by loading matching it against all TCAM-like cells in parallel and selecting the first TCAM-like cell that matches using standard TCAM techniques for tie removal among multiple matches, to produce the final result, and techniques for integrating the address space compression and compressed multi field classification on the device (chip) such that the input to the device is the list of original header fields and the output from the device is the index of the rule that matches the header fields.

Typically, the chip 108 could be configured as comprising classifier lookup structure and classifier lookup, typically hardwired.

Figure 3:
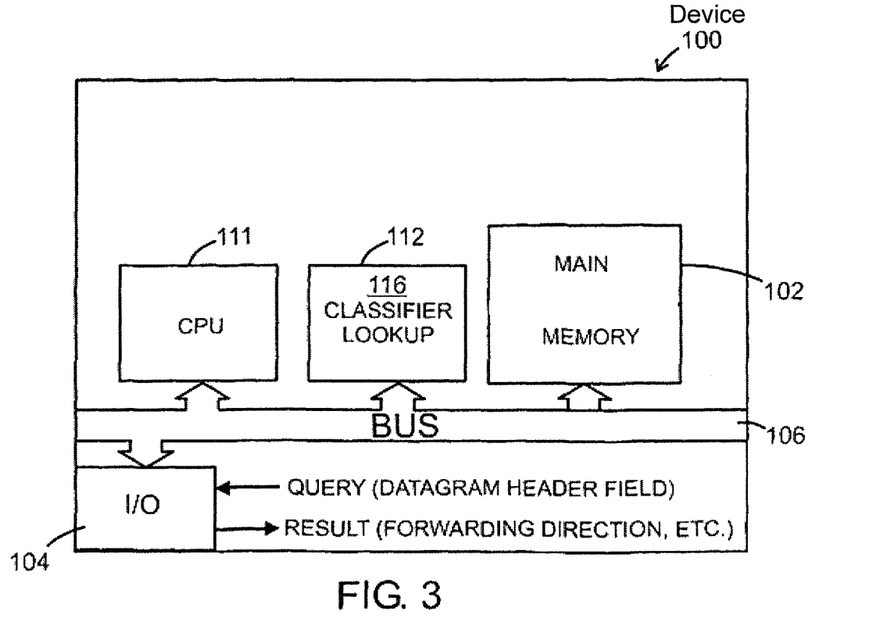
FIG. 3 illustrates a schematic block diagram of a software solution according to an embodiment of the present invention.

In an alternative embodiment of the present invention, illustrated in FIG. 3, the device 100 is implemented in software instead. To ease understanding, same reference numerals as already have been used in relation to FIG. 2 will be used as far as possible.

Typically, the control system 108 comprises a processor 111 connected to a fast computer memory 112 with a system bus 106, in which memory 112 reside computer-executable instructions 116 for execution; the processor 111 being operative to execute the computer-executable instructions 116 to:
providing in a storage 102, herein typically the main-memory,
  a datagram forwarding data structure provided for indicating where to forward a datagram in said network, and arranged to
receive incoming data traffic of a specific nature, belonging to
  at least a specific class among a number of pre-defined classes, and
classify the data traffic by determining the nature of the data traffic, provided by a process of inspecting values of one or more selected header field(s) of an address space of a data packet, and select a first matching class from an ordered list of classes providing multi-dimensional classification by means of compression.

Now is referred back to FIG. 1.

According to an embodiment of the present invention, the method comprises the step of providing a single field classifier is provided to compress the address space for each dimension, step 204.

According to an embodiment of the present invention, the method comprises that the set of single field classifiers are organized as a vector where compression is executed in each dimension simultaneously, step 204.

According to an embodiment of the present invention, the method comprises the step of analyzing the list of classes in each dimension to identify potential starting points providing the set Z, step 205.

According to an embodiment of the present invention, the method comprises the step of reproducing (mapping) the interval to a corresponding compressed interval by means of using said single field classifier provided for that particular dimension. The result is a compressed interval for each dimension in each rule and finally a list of rules that is totally compressed, step 206.

According to an embodiment of the present invention, the lookup is performed by means of in a first step 201, (or in parallel if implemented as hardware) looking up by means of 25 corresponding single field classifier for each header field of the packet. In this way, there is provided a list of compromised values of the header fields, step 207.

In a second step, multi-dimensional classification is performed (by means of TCAM if implemented in hard-ware) of the compromised list of header fields in the compressed list of rules.

The analysis of the original list of rules and the compression of the list of rules, as well as the definition of each single filed classifier is provided by means of software. The lookup could be provided by means of hard-ware, for instance by means of pipelining for improved performance. If the lookup is provided by means of software, it is possible to use any kind of legacy multi-dimensional classifier to provide matching of the compressed list.

Thus, the invention includes analysis of original list of rules, the definition of SFC for each dimension, as well as compressing sv list of rules.

According to an alternative embodiment of the present invention, there is provided a system, wherein two multi-dimensional classifiers is used where one is customized for basic IPv4 rules and the other for basic IPv6 rules.

We will now show how to use single field classification compress the address space for each dimension to $\min(2n+1, 2^{wi})$, where wi is the number of bits of the original header field in dimension i. By using this technique, the total number of bits involved in the actual D-dimensional classification is reduced from $w1+w2+\ldots+wD$ to $\min(\text{ceil}(\lg(2n+1), w1) + \min(\text{ceil}(\lg(2n+1), w2)+\ldots+\min(\text{ceil}(\lg(2n+1), wD)$.

Consider one dimension at a time and let [xi, yi] be the interval in the current dimension in rule Ri. Construct a pair of sets $$X=\{x1, x2, \ldots, xn\} \text{union}\{0\}$$

and $$Y=\{y1+1, y2+1, \ldots, yn+1\} \text{intersection} U,$$

where U is the universe (e.g. $\{0, 1, \ldots, 2^{128}-1\}$ for IPv6) and let $$Z = X \text{ union } Y.$$

The set $Z=\{z0, z1, \ldots, zm\}$, where $zj<zj+1$, is the set of smaller endpoints of all possible intervals $[z0, z1-1]$, $[z1, z2-1], \ldots, [zm, \max U]$, and the set of these intervals is a partition of U.

Define the mapping $\xi$ as follows:

$$\xi(x)=j, \text{ if } zj \leq x \leq Zj+1-1.$$

Clearly, $\xi$ is a mapping from U onto $\{0, \ldots, m\}$. Moreover, $m \leq 2n$ since at most one endpoint from each rule was added to X and Y respectively. It is straight forward to implementing $\xi$ by using a single field classifier. In particular, any of the methods in patent application 1-4 can be used. Furthermore, since $\xi$ is a monotonically increasing function, there is no need to store the actual data bits that constitute the result from the single field classifier explicitly. Instead, the result from lookup can be computed by tracing the lookup.

For each rule Ri, we want to map the interval [xi, yi] in the current dimension to a corresponding interval $[x0i, y0i]=\xi([xi, yi])$ in rule R'i. This is achieved as follows:

$$\xi([x,y])=[\xi(x),m], \text{ if } y=\max U$$

and $$[\xi(x), \xi(y+1)-1], \text{ otherwise.}$$

By performing these steps for each rule in each dimension, we obtain a new rule list R', which is an image $\xi(R)$ of the original rule list R under the multi dimensional mapping $\xi=[\xi 1, \xi 2, \ldots \xi D]$, where is the mapping in dimension i.

It remains to show that the first matching rule is preserved when compressing the address space. For a list of header fields, we define $$\xi([h1, h2, \ldots, hD])=[\xi 1(h1), \xi 2(h1), \ldots, \xi D(hD)].$$

If h lies in [x,y] is equivalent to $\xi$ (h) lies in $\xi$([x, y]), then [h1, h2, ..., hD] matches Ri if and only if $\xi$([h1, h2, ..., hD]) matches $\xi$(Ri), and we can be sure that the first matching rule is preserved by the mapping.

Hence, we must prove that h lies in [x,y] is equivalent to $\xi$ (h) lies in $\xi$([x, y]). For the lower bound we have
h$\geq$x implies that h$\geq$zj, where zj=x,
and hence $\xi$ (h)$\geq$j, and for the upper bound
h$\leq$y implies that h<zj', where zj'=y+1
which implies that $\xi$ (h)$\leq$j'−1. By the definition of $\xi$ for intervals we have that $\xi$([x,y])=[j,j'−1] and hence $\xi$(h) lies in ([x, y]).

The original idea was to use the address space compression scheme to map IPv6 addresses onto IPv4 addresses. Unless 2n+1>2^32, which we consider unlikely since it would correspond to having more than 2147483647 rules, our goal can easily be achieved. However, for more moderate rule lists, say 1 million rules, we can compress each IPv6 address onto a 21 bits integer instead of using 128 bits which is a reduction by 83%. Even though this does not reduce the combinatorial complexity of the packet classification problem as such, we believe that it will make things considerably easier for most software based D-dimensional packet classifiers, in particular if for those designed to handle addresses as intervals.

For D-dimensional classifiers that heavily exploit (or rather abuse) the common restriction of expressing address intervals as prefixes in rule lists a slightly different mapping must be used. Srinivasan et al. considered the problem of searching among prefix lengths for port intervals in V. Srinivasan, Subhash Suri, and George Varghese. Packet classification using tuple space search. In SIGCOMM, pages 135-146, 1999. They introduced the concept nesting levels which corresponds to prefix length and is defined as the number of levels in a hierarchy of intervals where each interval is a subset of the parent interval. We can push this further by mapping arbitrary intervals to prefixes where each nesting level adds at most two additional bits to the prefix length. It is straightforward to generate such a mapping and for most real applications we can expect the number of nesting levels to be less than 16 and thus all IPv6 prefixes can be mapped onto IPv4 prefixes.

When considering applications with extreme performance requirements, such as core backbone routers, classification is typically performed using a high performance TCAM chip. For IPv6 5-field multi dimensional classification (MFC-5), 296-bit TCAM cells are required. TCAM bits are extremely expensive, both in terms of implementation cost and power consumption.

Figure 6:
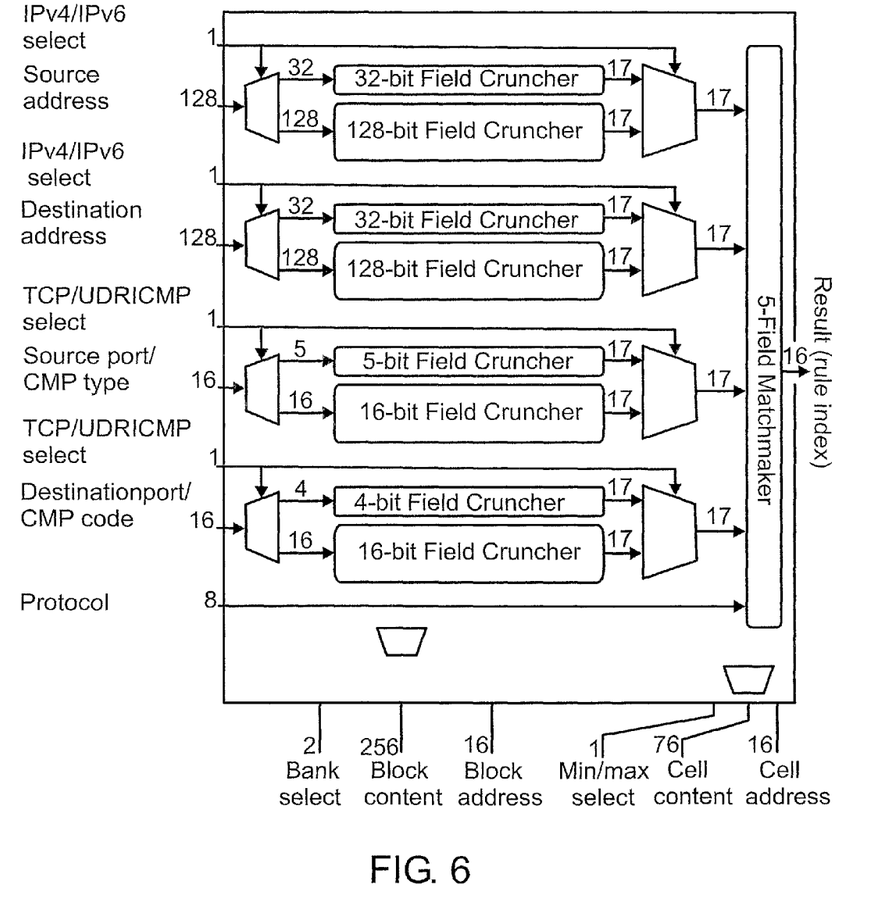
FIG. 6 illustrates an implementation of FIG. 5.

The cost for a bit of SRAM memory as used to store our hybrid 1-dimensional classifiers is small compared to the cost of a TCAM bit. We can therefore use two parallel 128-bit classifiers to perform simultaneous address space compression of the source and destination addresses to obtain a reduction from onto 128 bit to 17 bits as shown in FIG. 6. The resulting 5-fields, a total of 74 bits, can then be classified using a TCAM-like memory designed to match intervals instead of arbitrary wild-cards. Since the cost per bit in such a TCAM-like memory is should not be substantially higher than in an ordinary TCAM, the effective reduction of silicon area and power consumption can potentially be as high as 75%.

Cross producting is a commonly used method for combining 1-dimensional classifiers to form a D-dimensional classifier (see V. Srinivasan and George Varghese. Faster IP lookups using controlled prefix expansion. In Proceedings of the 1998 ACM SIGMETRICS joint international conference on Measurement and modeling of computer systems, pages 1-10. ACM Press, 1998). The idea is somewhat similar to our address compression scheme described above but there are a number of important differences which we will now discuss. We start with a list of n rules where each rule defines a D dimensional interval. When using cross producting, a set of D 1-dimensional classifiers are used to map D header fields onto a point in the D-dimensional universe Ucross={0, 1, ..., n−1}D. However, the mapping used in cross producting is extremely tight. Therefore, the only possible representation of the original rule list in Ucross is a representation without ties. This forces cross producting to map the original rule list onto a representation where each (mapped) point only can match a single mapped rule. As a result, the mapped representation of the rule list requires n^D storage, in the worst case, when using cross producting. In our scheme, the universe Uhybrid={0, 1, ..., 2n}^D is slightly larger. As a result, we can map each original rule list onto a corresponding mapped rule list where the criteria for tie removal of multiple matches is preserved. The resulting mapped rule list consist of the same number of rules as the original rule list.

In a basic scenario, each dimension corresponds to a certain kind of header field which we refer to as the type of the header field. In a basic IPv4 MFC-5 rule, the types of the first and second dimensions are IPv4 source and destination address respectively whereas the types of the third and fourth dimensions are source address and destination address respectively.

Typically, it is assumed that the protocol, which corresponds to the fifth dimension, is either TCP or UDP. Otherwise, the specification of port ranges in the third and fourth dimension would not make any sense. In a basic IPv6 MFC-5 rule the address intervals are IPv6 addresses instead of IPv4 addresses.

One problem with a basic scheme is how to handle rule lists where basic IPv4 and basic IPv6 rules are mixed. If the actual multi-dimensional classification is performed using software (i.e. computer program product running on a computer), using a single multi-dimensional classifier becomes very messy since two address spaces with different sizes needs to be combined. The software will be hard and costly to implement, expensive to maintain and most likely very inefficient. As an alternative approach, two multi-dimensional classifiers can be used where one is customized for basic IPv4 rules and the other for basic IPv6 rules. While this approach may (or may not) be feasible if there are only two types of rules, it does not scale to support the multitude of types of rules that are needed to implement powerful and sophisticated security polices in performance critical network environments. The first concrete situation when this scaling becomes an issue is when we want to support other protocols such as for example ICMP (Internet Control Message Protocol) and ESP (Encapsulating Security Payload) that may follow the IP header. ICMP does not contain port numbers. Instead, there is a 5-bit type and a 4-bit code (even though both are represented as 8-bit fields in the ICMP header. The scaling issues becomes even worse when we want to support rules for IP tunnelling where there may be two or more IPv4/IPv6 headers before the transport header thus yielding an MFC-7 rule, MFC-9 rule etc. In such a situation, the type of the third dimension can be an IPv4 source address, an IPv6 source address, an UDP source port, a TCP source port, or an ICMP type. By allowing even more different kinds of transport protocol rules are supported and/or the levels of tunnelling the situation becomes even worse. In principle, a custom multi-field classifier is required for each possible combination thus causing severe scalability issues both in software and hardware.

In an additional embodiment of the present innovation we will first generalize the previously described address compression technique into a generic crunching step which is then combined with a generic matchmaker to overcome the problems with many possible combinations of rule structures and levels of tunnelling as described above. The reason for using the term crunching instead of compression is that, even though the key idea is to reduce the effective size of the header fields before multi-dimensional classification, the effective size of some fields may increase as a result of the process. The matchmaking can be performed either in hardware, using a TCAM-like memory which we have briefly described above and will describe in more detail in the context of the present embodiment, or in software using any standard technique for multi-dimensional classification including linear search, cross-producting, quad-trees etc.

In one embodiment, a custom cruncher is used for each dimension and the intervals are mapped such that the first interval of each type is mapped to the number following the mapping of the last interval of the previous type in said dimension.

In one embodiment, the method comprises the step of reproducing (mapping) each interval in each class to a corresponding crunched interval by means of using said crunching module provided for that particular dimension.

In one embodiment, the matchmaking of the crunched key in the ordered list of crunched classes is performed using linear search.

In one embodiment, the matchmaking of the crunched key in the ordered list of crunched classes is performed using any multi field classifier based on exhaustive search.

In one embodiment, the matchmaking of the crunched key in the ordered list of crunched classes is performed using any decision tree based multi field classifier.

In one embodiment, the matchmaking of the crunched key in the ordered list of crunched classes is performed using any multi field classifier based on decomposition into multiple single field classifications followed by combination of results.

In one embodiment, the matchmaking of the crunched key in the ordered list of crunched classes is performed using any multi field classifier based on tuple space partitioning.

In one embodiment, the matchmaking of the crunched key in the ordered list of crunched classes is performed using any legacy multi-field classifier.

In one embodiment, the matchmaking of the crunched key in the ordered list of crunched classes is performed using hardware accelerated linear search in the form of a TCAM memory.

In one embodiment, the matchmaking of the crunched key in the ordered list of crunched classes is performed using hardware accelerated linear search (Extended TCAM memory) where each crunched field is compared to the starting point and end point of each interval in dimension of each class simultaneously and a priority encoder is used to select the first matching class.

Figure 4:
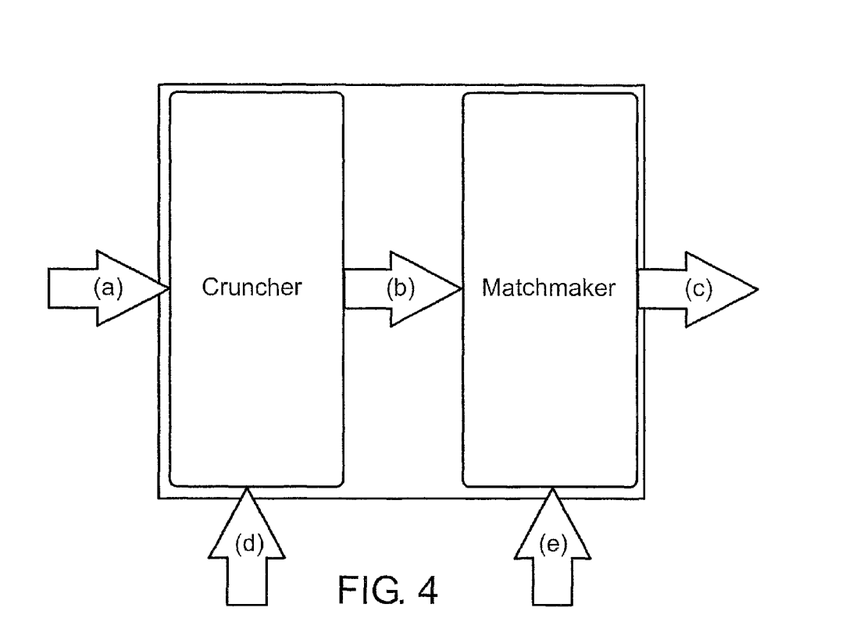
FIG. 4 illustrates an overview of a multi-field classifier based on the cruncher-matchmaker architecture.

In FIG. 4 we show an overview of a multi-field classifier based on the cruncher-matchmaker architecture. In (a), the original list of header field values enters the cruncher where it is converted to type independent format (b) which then enters the matchmaker that produces the result (c). In (d) and (e) we show the maintenance of the cruncher and the matchmaker where updates are entered to change the behaviour of the classifier.

The cruncher consists of an array of crunching modules. Potentially, there is one module for each dimension. Each module consists of an array of custom crunchers with one custom cruncher for each type. We refer to a custom cruncher designed to crunch a w-bit field as w-bit field cruncher.

Figure 5:
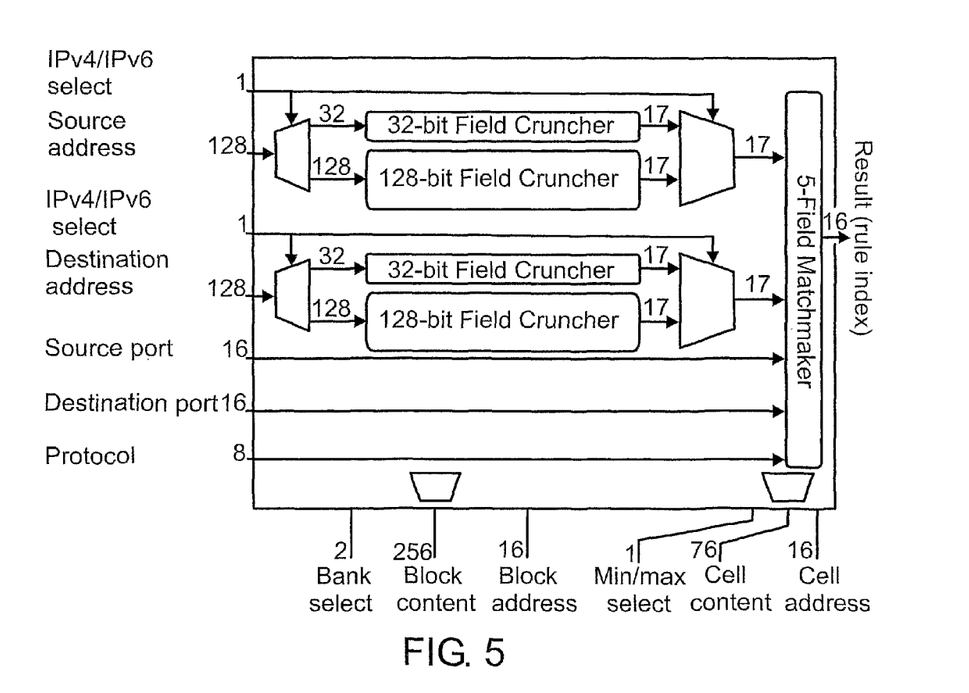
FIG. 5 illustrates a source address cruncher.

The cruncher contains one module for each dimension where the crunching process can improve the classification as shown in FIG. 5. In this case, we support basic IPv4 and IPv6 rules and the total number of rules is 2^16 which means that it does not make sense to crunch ports and protocols. The crunchers are set up in the same fashion as the address compressors except that inputs can consist of different types of header fields. The source address cruncher in FIG. 5 is configured by sorting all IPv4 source potential interval starting points to obtain a list of at most 2*N4+1 IPv4 intervals where interval X is mapped to X. The IPv6 cruncher is configured in a similar fashion except that interval Y is mapped to Y+Xmax+1 instead of to Y as would be the case if there only was an IPv6 cruncher. If there are more kinds of fields to combine the first interval from the next field is mapped to the value of the mapping of the last interval from the previous kind of field plus one. This can be repeated to support crunching and thus combination of an arbitrary number of different kinds of header fields in each dimension.

As an additional embodiment, in FIG. 6 it is shown how this method is applied to support IPv4/IPv6 MFC-5 rules with both TCP, UDP and ICMP.

Figure 7:
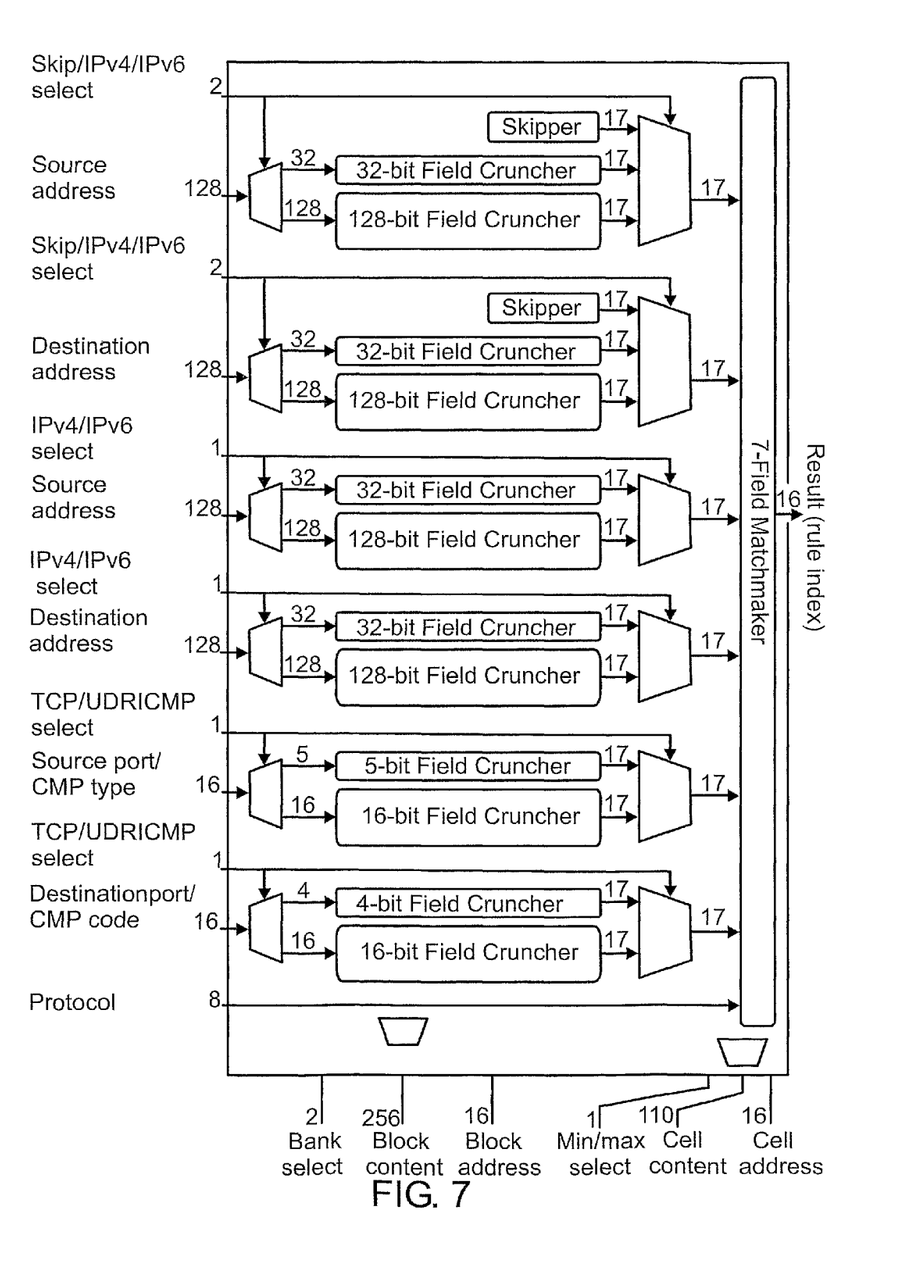
FIG. 7 illustrates how to support IPv4/IPv6 tunneling.

In yet another embodiment, we show in FIG. 7 how to support IPv4/IPv6 tunneling in addition to the rules supported by the device in FIG. 6 thus yielding an IPv4/IPv6 MFC-7 classifier with support for both TCP, UDP and ICMP. Observe that the first source and destination address crunchers also contain a skipper which is used to encode MFC-5 rules where the outermost IPv4/IPv6 header is not matched against.

In an alternative embodiment, the skipper could have been implemented in the third and fourth address cruncher modules instead with essentially the same result if the matchmaker is implemented in hardware (not shown).

In yet another alternative embodiment the skipper could be skipped altogether by handling the transport protocol fields from MFC-5 rules in the third and fourth cruncher modules by combining source port and ICMP type in the third module and destination port and ICMP code in the fourth module (not shown).

Figure 8:
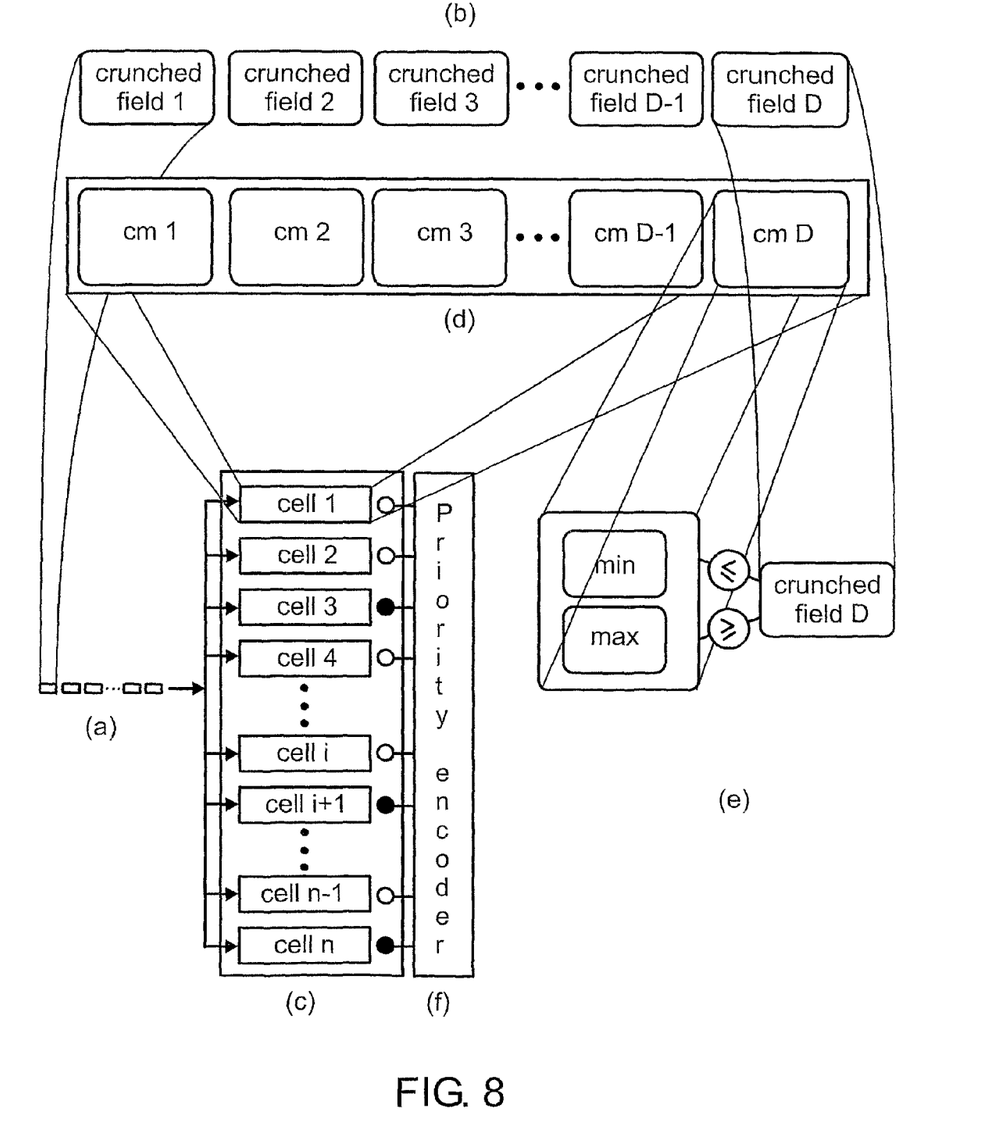
FIG. 8 illustrates TCAM-like memory implementation

In an additional embodiment which can be used in combination with all previously described embodiments the matchmaker can be implemented using a TCAM-like memory as shown in FIGS. 8 (a) and (b) shows the query key in type independent format (after crunching). In (c) the overview of the matchmaker is shown as an array of cells and in (d) a single cell is shown in more detail. Each cell consist of a register for each dimension and in (e) the matching of a crunched field and cell register containing min and max values for the represented interval is shown in detail. In order to match, all dimensions must match. To combine the results into a single value representing the first matching cell, a priority encode is used (f).

In yet another embodiment there could be a custom cruncher which performs by-pass by outputting the same value as its input. By-pass us used in such an embodiment if some crunchers are implemented in hardware in a device and some crunchers are implemented in a computer program executing on a computer to support the device by performing some less prioritized crunching in slow-path and thereafter sending the result in form of a partially pre-crunched query key to the cruncher in the hardware device.

The main purpose of the matchmaker is to eliminate the impact from the combinatorial complexity of the packet classification problem whereas the main purpose of the cruncher is to reduce the impact of large search keys (e.g. IPv6). Furthermore, the partitioning of the problem into crunching and matchmaking also separates the different technologies used to implement the classification engine in hardware. Since crunching is an algorithmic approach all data structures involved can be stored in SRAM using pipelining and parallelism to achieve maximum performance. Matchmaking on the other hand is implemented using Extended TCAM (ET-CAM) memory which performs exhaustive search in parallel in a list of rules where each rule consist of an interval for each dimension as opposed to prefixes required by standard TCAMs.

For an on-chip implementation, there are mainly three performance metrics of interest: space, speed, and power. Traditionally, space is measured in number of bits of memory required to represent a rule list of a certain size. However, since different memory technologies are used in the device we will count the total number of transistors required instead. SRAM requires 6 transistors per bit, TCAM requires 16 transistors per bit, and E-TCAM requires 44 transistors per bit. Speed and power are closely related. To achieve maximum speed, we will assume that both pipelining and parallelism are used to maximum extent. This will increase the number of bits simultaneously involved in processing which in turn increases the power consumption. The cost for simply storing a passive bit in SRAM is 20 nanowatts compared to 3 microwatts for storing a bit in a TCAM [15]. Given the power consumption for TCAM bits and the ratio of transistors per bit compared to E-TCAM we estimate that the power consumption of an E-TCAM bit is 44/16·3=8.25 microwatts. Finally, the algorithmic parts of the engine running in the cruncher may perform various operations simultaneously. The total number of active bits simultaneously involved in processing in the cruncher depends on the algorithms used, the degree of parallelism and pipelining, and the configuration of the memories. It is fair to assume that none of these operations are more costly per bit than the range matching performed by an E-TCAM and therefore we will assume that the power consumption in the cruncher is 8.25 microwatts per active bit.

We now define a Hybrid Classification Block (HCB) to be multi field packet classifier constituted by a cruncher-matchmaker pair, including any of the embodiments described above. All embodiments of multi field packet classifiers described above consist of a single HCB. Given the respective costs in terms of space and power for Extended TCAM memory compared to SRAM memory it should be possible to reduce the total cost in terms of space and power consumption by increasing the degree of parallelism in the crunching step while simultaneously reducing the number of bits of each E-TCAM cell. If the total number of rules is small or multiple typed rules are supported, there will be one crunching module for each dimension. By reducing the number of rules by 50%, up to one E-TCAM bit per dimension can be saved. This suggests that two HCBs, each dimensioned for n/2 rules, can be used in parallel to implement a packet classifier for supporting n rules. This clearly reduced the cost for matchmaking. To get an understanding of the additional costs for crunching we observe that the total number of active bits in one dimension in the cruncher is obtained by multiplying the memory width (memory block size) for each custom cruncher or crunching module by the number of memory accesses (assuming that one memory access corresponds to a pipeline step). The total number of active bits is then obtained by adding the numbers for each dimension together. By using 2 HCBs, the number of bits involved in matchmaking is reduced by up to n*D at the cost of increasing the number of active bits in crunching by a factor of 2. By further increasing the number of HCBs the number of E-TCAM bits can be reduced further at the cost of increasing the number of active bits in the crunching. Intuitively, one could realize that there is a balance between the number of MCBs and the number of rules and that choosing the optimal number of rules to be stored in each MCB to achieve lower overall cost is an optimization problem in itself.

As an example, we have found that N=508 rules in each HCB is optimal when n=64k. The relative savings for using this configuration are approximately 7% and 27% for space and power consumption respectively, compared to using a single HCB.

Figure 9:
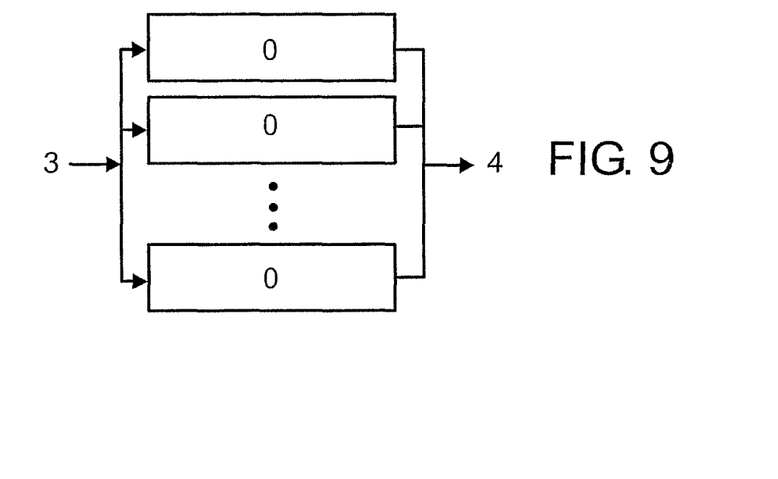
FIG. 9 illustrates a multi-field classifier.

FIG. 9 shows a multi field packet classifier, for computing the index of the first matching rule 4 of the query key 3, comprised of an array of hybrid classification blocks 0 running in parallel.

Having presented the initial idea and benefits of increasing parallelism in the cruncher we are now ready to describe additional embodiments of the invention:

In an additional embodiment which can be used in combination with all previously described embodiments a multi field packet classifier capable of storing n=M*N rules is constituted by M HCBs, each capable of representing a maximum of N rules, where all HCBs are executing in parallel.

In an additional embodiment which can be used in combination with all previously described embodiments a multi field packet classifier capable of storing n=M*N rules is constituted by M HCBs, each capable of representing a maximum of N rules, where all HCBs are executing in parallel, where M and N are chosen to achieve the lowest cost in terms of space, power or any other imaginable cost parameter (that can be used to extend the model).

We will now extend these embodiments in two directions. The first direction is a generalization of the algorithm into a family of algorithms where the number of bits involved in matchmaking can be reduced at the cost of increasing the space costs for the cruncher. This will add another optimization parameter to be considered when optimizing the total cost. The second direction is related to implementing incremental updates.

We start with the first direction. It is assumed above that each custom cruncher in each HCB computes a single value which corresponds to a crunched header field for the respective dimension and HCB. However, it is possible to merge two custom crunchers together into one custom cruncher which represent twice as many intervals as long as a pair of values are computed for each dimension and pair of HCBs. In this way, two HCBs share cruncher. The cost for this in terms of space for storing interval boundaries is not affected since the total number of intervals in the two crunchers are the same as the sum of the number of intervals in the original crunchers. However, the amount of data stored doubles since each interval is associated with two data fields instead of only one. The advantage of this approach is that the number of active bits in the crunchers are reduced by a factor of two, meaning that we have a yet another potential trade off which can be used to decrease the costs further.

We now define a Generalized Hybrid Classification Block (GHCB) with parameters M and N to be multi field packet classifier constituted by a cruncher and M matchmakers, including any of the embodiments described above, where each matchmaker is capable of representing N rules, where the cruncher computes an array of M crunched header fields instead of just a single crunched header field, for each dimension, where each crunched header field is processed associated with the matchmaker with the same array index as the crunched header field.

Figure 10:
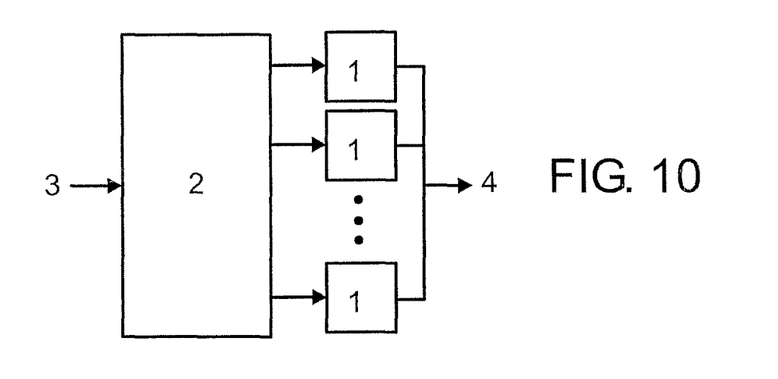
FIG. 10 illustrates a generalized hybrid classification block.

FIG. 10 shows a generalized hybrid classification block, for computing the index of the first matching rule 4 of the query key 3, comprised of a cruncher 2 and an array of matchmakers 1 running in parallel.

By using extended hybrid classification blocks, we can generalize the multi field packet classifier concept even further.

We define a Generalized Hybrid Classifier (GHC) with parameters L, M, and N to be a multi field packet classifier, including any of the embodiments above, capable of representing n=L*M*N rules, comprised of L generalized hybrid classification blocks with parameters M and N that runs in parallel.

Figure 11:
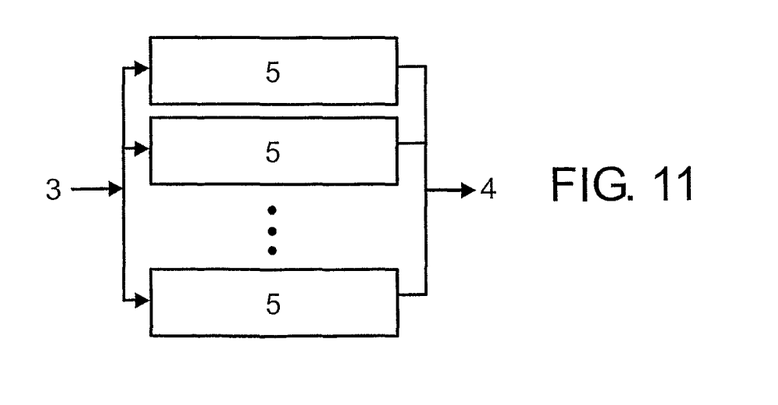
FIG. 11 illustrates a multi-field packet classifier.

FIG. 11 shows a multi field packet classifier, for computing the index of the first matching rule 4 of the query key 3, comprised of an array of generalized hybrid classification blocks 5 running in parallel.

Before moving on to discussing specific embodiments we will take a minute to discuss how the generalized hybrid classifier concept related to previously described embodiments. By choosing L=M=1 and N=n, we obtain a simple multi field classifier where one single cruncher serves a single matchmaker where all (crunched) rules are stored. Another extreme would be to have L=1, M=n and N=1, which means that there is a single cruncher that computes an array of n crunched header field for each dimension that are sent to one very simple matchmaker for each rule. To construct a multi field packet classifier with M' hybrid classification blocks where each hybrid classification block represents N' rules, according to the description above, we use a generalized hybrid classifier with parameters L=M', M=1, and N=N'.

We are now ready to describe some additional embodiments.

In an additional embodiment which can be used in combination with all previously described embodiments a multi field packet classifier capable of storing n=L*M*N rules is constituted by a generalized hybrid classifier with parameters L, M and N.

In an additional embodiment which can be used in combination with all previously described embodiments a multi field packet classifier capable of storing n=L*M*N rules is constituted by a generalized hybrid classifier with parameters L, M and N, where L, M and N are chosen to achieve the lowest cost in terms of space, power or any other imaginable cost metric.

In an additional embodiment which can be used in combination with all previously described embodiments a multi field packet classifier capable of storing n=L*M*N rules is constituted by a generalized hybrid classifier with parameters L, M and N, where L, M and N are chosen to achieve the lowest cost in terms of space, power or any other imaginable cost metric, while taking into account that the array of M results stored with each interval in each cruncher yield an increase in the number of passive SRAM bits required to represent the multi field packet classifier.

We now move on to discussing the second direction incremental updates. Let u(L, M, N) be our update cost budget, i.e., the maximum number of memory accesses etc. we are allowed to spend on one update. We consider the data structure to be full when additional reconstruction work would be required to accommodate for further growth. The main principle behind our maintenance strategy is to actually spend all these memory accesses on each update in the hope of postponing the first too expensive update as much as possible. For the purpose of adding support for incremental updates, let us consider a packet classifier comprised by a generalized hybrid classifier with parameters L', M' and N' such that L'*M'*N'=n. Our update cost budget corresponds to the cost of complete reconstruction of a pair of adjacent GHCBs. By performing one piece of reconstruction for each update we then hope to be able to distribute the rules evenly to delay insertion into a full GHCB as much as possible. To achieve this, we need a maintenance strategy that (i) determines which two GHCBs to reconstruct, (ii) determines the direction of moving the rules (from which GHCB, to which GHCB), and (iii) determines how many rules to move. We will now describe such a strategy called Bucket List Maintenance.

We will describe the strategy in terms of a system of M GHCBs each capable of storing up to N rules. The relationship with the parameters of the generalized hybrid classifier is thus given by: M=L'*M' and N=N'.

First, let us present the problem in a slightly more abstract form. Let B1, B2, . . . , BM be a number of buckets corresponding to the M GHCBs. Each bucket can store up to N items corresponding to N rules. Let $x[i,1], \ldots, x[i, mi]$ be the indices of the items stored in bucket Bi. Since we are allowed to reconstruct two adjacent GHCBs, we can move an arbitrary number of items between two adjacent buckets. When an item is inserted into a full bucket, it fails and the system of buckets is considered full. Only insertions needs to be considered since each deleted operation reduces n by 1 while financing the same amount of reconstruction work as an insert operation. The role of a maintenance strategy is to maximize the number items that can be inserted by delaying the event of insertion into a full bucket as much as possible. We perform insertions in a number of phases, where the current phase ends either when a bucket becomes full or when M items have been inserted, whichever happens first. Consider a phase where $m \leq M$ items have been inserted. For each item inserted we can move an arbitrary number of items between two adjacent buckets. This is called a move.

Proposition 10 (a) m−1 moves is sufficient to distribute these m items evenly, i.e. one item per bucket, no matter how they were inserted, (b) these m−1 moves can be performed after the current phase.

Initially, we have 0 items in each bucket or equivalently space for N0=N items. Provided that $N \geq M$, M items will be inserted in the first phase. By Proposition 10, these can be evenly distributed among the buckets, by performing the maintenance after the first phase. When the next phase begins, there will be 1 item per bucket or equivalently space for N1=N0−1=N−1 additional items. This can be repeated until Ni=N−i<M, and the total number of items inserted up to this point is M·(N−M). In phase Ni, the smallest number of elements that can be inserted is M−1 if all items falls in the same bucket and in the remaining phases the number of insertions is reduced by 1 in each phase until only one item can be inserted. According to Proposition 10, maintenance can still be performed but only for a limited number of buckets. If we focus maintenance efforts to the buckets where insertions occur we can still guarantee that the available space does not decrease by more than one item for each phase. Hence, an additional sum(i, i=1 . . . M)=M·(M+1)/2 items can be inserted yielding a total of MN−M·(M−1)/2 items. For each insertion in the current phase we can perform one move (of maintenance work) for the previous phase. The difference in number of inserted items is at most 1 between the previous and the current phase. By Proposition 10 (a), the number of insertions of the current phase is thus sufficient to pay for the maintenance for the previous phase and Proposition 10 (b) follows. It remains to prove Proposition 10 (a). To distinguish between items that have not been maintained from the previous phase and items being inserted in the current phase we colour the items from the previous phase blue and the inserted items red. First consider the case when m=M. The maintenance process basically operates on the buckets in a left to right fashion (with an exception). Let Bi be the number of blue items in bucket i, and k the index of the rightmost completed bucket—k is initially zero. We start in rightward mode: Find the leftmost bucket r satisfying sum(Bj, j=k+1 ... r)≧r-k. If r=k+1, move Br-1 (possibly zero) item from bucket r to bucket r+1 and increase k by 1 since bucket r is completed. Otherwise (r>k+1), set I=r and enter leftward mode. In leftward mode the maintenance process works as follows: If I=k+1, k is increased to r-1 and we immediately enter rightward mode. Otherwise, I-(k+1)-sum(Bj, j= k+1 ... I-1) items are moved from bucket I to bucket I-1, and I is decreased by 1. FIG. 4 illustrates how completion of three buckets is achieved in three steps in rightward mode followed by completing four buckets in leftward mode in the last four steps. Switching between rightward and leftward mode is free of charge. For each move performed in rightward mode one bucket is completed. In leftward mode there are two cases. If there is only one move before switching to rightward mode, one bucket is completed. Otherwise, no bucket is completed in the first move but this is compensated by completing two buckets in the last. For each move between the first and the last move one bucket is completed. To summarize this, each move completes one bucket and hence there are M-1 buckets that contains exactly 1 blue item each after M-1 moves. There are M blue items in total and hence the last bucket must also contain 1 blue item (and is thus also completed). We have proved Proposition 10 (*a*) for m=M. If m<M, we can use a left to right greedy algorithm to partition the set of buckets into a minimum number of regions where the number of buckets in each region equals the total number of blue items in that region. Some buckets will not be part of a region but this is expected since less than M blue items are available. Within each region we run the maintenance process in exactly the same way as for m=M. This concludes the proof of Proposition 10 (*a*) as well as the description and analysis of our maintenance strategy.

Based on this discussion, we have some additional embodiments.

In an additional embodiment which can be used in combination with all previously described embodiments a dynamic multi field packet classifier capable of storing at least n=MN-M·(M-1)/2 rules is constituted by M GHCBs, each capable of representing a maximum of N rules, where all GHCBs are executing in parallel, where incremental updates are implemented by completely reconstructing a pair of adjacent GHCBs, for each insertion or deletion of a rule, selected according to the bucket list maintenance strategy described above meaning that both which buckets to be reconstructed are selected as well as how many rules to move between the buckets.

In an additional embodiment which can be used in combination with all previously described embodiments a dynamic multi field packet classifier capable of storing at least n=MN-M·(M-1)/2 rules is constituted by M GHCBs, each capable of representing a maximum of N rules, where all GHCBs are executing in parallel, where incremental updates are implemented by completely reconstructing a pair of adjacent GHCBs, for each insertion or deletion of a rule, selected according to the bucket list maintenance strategy described above meaning that both which buckets to be reconstructed are selected as well as how many rules to move between the buckets, where M and N are chosen to achieve the lowest cost in terms of space, power or any other imaginable cost metric.

We define the bit mask representation to be a representation of a subset U where each element of U corresponds to one bit in a bit array and where a bit is set if and only if the corresponding element is a member of the subset represented.

In an additional embodiment which can be used in combination with all previously described embodiments the matchmaker is implemented by representing the intervals in one or more dimensions in one or more rules using the bit mask representation instead of storing the smallest and largest value of the interval.

In a basic matchmaker, each dimension in each rule is represented by an interval. We define a generalized matchmaker to be a matchmaker where each dimension in each rule can be represented by an arbitrary subset of the crunched universe in said dimension as opposed to a simple interval.

In an additional embodiment which can be used in combination with all previously described embodiments there is provided a generalized matchmaker where the crunched rule list is represented using subsets in one or more dimensions in one or more rules as described in the definition of generalized matchmaker.

Figure 12:
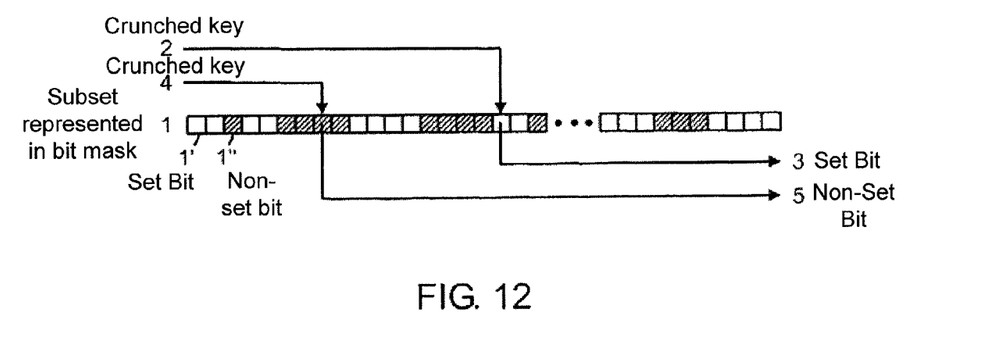
FIG. 12 illustrates a subset represented in a bit mask representation where set bits are illustrated by white cells and non-set bits are represented by shaded cells.

FIG. 12 illustrates a subset represented in the bit mask representation 1, where set bits are illustrated by white cells 1' and non set bits are illustrated by shaded cells 1"; wherein 3 shows a crunched key used to index into the array where the result is a match, i. e. the key is a member of the subset represented by the bit mask, indicated by 30 a set bit 3; 4 shows a crunched key used into the bit array where the result is a mismatch, i.e. the key is not a member of the subset represented by the bit mask, indicated by a non set bit 5.

The invention claimed is:

1. A method for performing specific data forwarding actions depending on nature of data traffic comprising data packets, the method comprising the steps of:
   receiving incoming data traffic of a specific nature, belonging to at least a specific class among a number of pre-defined classes,
   classifying the incoming data traffic by determining the nature of the incoming data traffic, provided by a process of inspecting values of one or more selected header field(s) of an address space of a data packet, and selecting a first matching class from an ordered list of the pre-defined classes providing multi-dimensional classification by means of compression, wherein a single field classifier is provided in an extended ternary content addressable memory (ETCAM) for each dimension to compress the address space from each dimension and at least some cells of the ETCAM include boundaries of one interval for multi-dimensional classification of the incoming data traffic.

2. The method according to claim 1, wherein a set of single field classifiers are organized as a vector where the compression is executed in each dimension simultaneously.

3. The method according to claim 1, comprising the step of analyzing the ordered list of pre-defined classes in each dimension to identify potential starting points providing a set Z.

4. The method according to claim 3, wherein each such set of potential starting points are represented in the single field classifier, in which the result of a lookup is provided by a number corresponding to the at least one interval.

5. The method according to claim 4, comprising the step of reproducing the interval to a corresponding compressed interval by means of using said single field classifier provided for that particular dimension.

6. The method according to claim 1, wherein a lookup is performed by means of in the first step, or in parallel if implemented as hardware looking up by means of corresponding single field classifier for each header field of the packet, and in the second step, multi-dimensional classification is performed by means of the ETCAM if implemented in hardware of a compromised list of header fields in a compressed list of rules.

7. A classifier device for representing a partition of n w-bit intervals associated to d-bit data in a data communications network, the device comprising:
   a storage for storing a datagram forwarding data structure provided for indicating where to forward a datagram in a network, which data structure is in the form of a tree comprising at least one leaf and possibly a number of nodes including partial nodes, said data structure having a height, corresponding to a number of memory accesses required for looking up a largest stored non-negative integer smaller than or equal to a query key,
   an interface arranged to receive incoming data traffic of a specific nature, belonging to at least a specific class among a number of pre-defined classes, and
   a classifier arranged to classify the incoming data traffic by determining nature of the incoming data traffic, provided by a process of inspecting values of one or more selected header field(s) of an address space of a data packet, and selecting a first matching class from an ordered list of classes providing multi-dimensional classification by means of compression, wherein classier is provided in an extended ternary content addressable memory (ETCAM) for each dimension to compress the address space from each dimension and at least some cells of the ETCAM include boundaries of one interval for multi-dimensional classification of the incoming data traffic.

8. The classifier device according to claim 7, wherein the storage is a TCAM memory.

9. The classifier device according to claim 7, wherein a two multi-dimensional classifier is used where one dimension is customized for basic IPv4 rules and the other for basic IPv6 rules.

10. A computer program product stored on a non-transitory computer readable medium and directly loadable into the internal memory of a digital computer, characterized in that said product comprises software code performing the steps of claim 1.

11. A computer program product comprising a non-transitory computer readable medium, characterized in that, on said medium the computer program is stored as computer program code means, when it is loaded on a computer, to make the computer perform the steps of claim 1.

12. The method according to claim 1, comprising the step of: from the ordered list of pre-defined classes providing multi-dimensional classification by means of crunching to produce a crunched query key followed by matchmaking to select the first matching class from an ordered list of crunched classes generated by crunching an original list of classes.

13. The method according to claim 12, wherein the single field classifier is provided to perform crunching in each dimension.

14. The method according to claim 1, wherein a cruncher is organized as a vector of crunching modules with potentially one crunching module for each dimension.

15. The method according to claim 1, wherein each crunching module is organized as a vector of custom crunchers for each type header field.

16. The method according to claim 1, wherein the purpose of a cruncher is to compress the address space for each dimension.

17. The method according to claim 1, wherein one custom cruncher in a particular dimension is implemented by a skipper which outputs a fixed number encoding the absence of a certain header field in said dimension.

18. The method according to claim 1, wherein one custom cruncher in a particular dimension is implemented by by-pass which outputs its input constituting of a pre-crunched header field in said dimension.

19. The method according to claim 18, wherein the pre-crunching is performed in separate pre-crunching device.

20. The method according to claim 18, wherein the pre-crunching is performed by computer program product directly loadable into the internal memory of a digital computer.

21. The method according to claim 1, wherein crunching is executed in each dimension simultaneously.

22. The method according to claim 1, wherein crunching is executed in each dimension sequentially.

23. The method according to claim 1, wherein each such set of potential starting points are represented in a custom cruncher constituted by a single field classifier, in which the result of a lookup is provided by the number of the present interval.

24. The method according to claim 12, wherein a custom cruncher is used for each dimension and the intervals are mapped such that the first interval of each type is mapped to the number following the mapping of the last interval of the previous type in said dimension.

25. The method according to claim 12, comprising the step of reproducing each interval in each class to a corresponding crunched interval by means of using a crunching module provided for that particular dimension.

26. The method according to claim 1, wherein the matching of a crunched key in an ordered list of crunched classes is performed using linear search.

27. The method according to claim 1, wherein the matching of a crunched key in an ordered list of crunched classes is performed using any multi field classifier based on exhaustive search.

28. The method according to claim 1, wherein the matching of a crunched key in an ordered list of crunched classes is performed using any decision tree based multi field classifier.

29. The method according to claim 1, wherein the matching of a crunched key in an ordered list of crunched classes is performed using any multi field classifier based on decomposition into multiple single field classifications followed by combination of results.

30. The method according to claim 1, wherein the matching of a crunched key in an ordered list of crunched classes is performed using any multi field classifier based on tuple space partitioning.

31. The method according to claim 1, wherein the matching of a crunched key in an ordered list of crunched classes is performed using any legacy multi-field classifier.

32. The method according to claim 1, wherein the matching of a crunched key in an ordered list of crunched classes is performed using hardware accelerated linear search where each crunched field is compared to the starting point and end point of each interval in dimension of each class simultaneously and a priority encoder is used to select the first matching class.

33. The method according to claim 12, wherein an original list of header field values enters a cruncher where it is converted to type independent format which then enters a matchmaker that produces the result.

34. The method according to claim 12, wherein if there are more kinds of fields to combine the first interval from the next field is mapped to the value of the mapping of the last interval from the previous kind of field plus one; wherein this is repeated to support crunching and thus combination of an arbitrary number of different kinds of header fields in each dimension.

* * * * *

UNITED STATES PATENT AND TRADEMARK OFFICE
CERTIFICATE OF CORRECTION

PATENT NO.       : 8,477,773 B2  
APPLICATION NO.  : 12/446595  
DATED            : July 2, 2013  
INVENTOR(S)      : Mikael Sundström Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 941 days.

Signed and Sealed this
Eighth Day of September, 2015

Michelle K. Lee
*Director of the United States Patent and Trademark Office*